United States Patent
Mihune et al.

(10) Patent No.: US 12,533,992 B2
(45) Date of Patent: Jan. 27, 2026

(54) ELECTRIC VEHICLE, AND CONTROL METHOD FOR ELECTRIC VEHICLE

(71) Applicant: KAWASAKI MOTORS, LTD., Akashi (JP)

(72) Inventors: Humisato Mihune, Kobe (JP); Eisaku Kitagawa, Akashi (JP); Ryohei Yoshida, Akashi (JP)

(73) Assignee: KAWASAKI MOTORS, LTD., Akashi (JP)

( * ) Notice: Subject to any disclaimer, the term of this patent is extended or adjusted under 35 U.S.C. 154(b) by 22 days.

(21) Appl. No.: 18/390,459

(22) Filed: Dec. 20, 2023

(65) Prior Publication Data

US 2024/0208364 A1    Jun. 27, 2024

(30) Foreign Application Priority Data

Dec. 23, 2022    (JP) ................................ 2022-207041

(51) Int. Cl.
*B60L 58/21*    (2019.01)
*B60L 50/60*    (2019.01)
*H02J 7/00*    (2006.01)

(52) U.S. Cl.
CPC ............... *B60L 58/21* (2019.02); *B60L 50/66* (2019.02); *H02J 7/0014* (2013.01); *H02J 7/0047* (2013.01); *B60L 2240/545* (2013.01); *B60L 2240/547* (2013.01); *B60L 2240/549* (2013.01)

(58) Field of Classification Search
None
See application file for complete search history.

(56) References Cited

U.S. PATENT DOCUMENTS

| | | | |
|---|---|---|---|
| 2007/0029986 A1* | 2/2007 | Nakamura | B60L 50/16 323/318 |
| 2014/0210415 A1* | 7/2014 | Ohmori | H01M 10/44 320/118 |
| 2014/0225622 A1* | 8/2014 | Kudo | B60L 7/14 324/433 |
| 2016/0280306 A1 | 9/2016 | Miyashiro et al. | |
| 2021/0234388 A1* | 7/2021 | Kawamura | H01M 10/441 |
| 2023/0042679 A1* | 2/2023 | Cheon | H01M 10/425 |
| 2023/0216315 A1* | 7/2023 | Liao | H02J 7/0048 320/126 |

FOREIGN PATENT DOCUMENTS

WO    2015-068753 A1    5/2015

\* cited by examiner

*Primary Examiner* — Rexford N Barnie
*Assistant Examiner* — Aqeel H Bukhari
(74) *Attorney, Agent, or Firm* — PROCOPIO, CORY, HARGREAVES & SAVITCH LLP

(57) ABSTRACT

There are provided an electric vehicle and a control method thereof, the electric vehicle including: a motor configured to cause the electric vehicle to travel; a plurality of battery packs configured to supply electric power to the motor; an electric power path electrically connecting the motor and the plurality of battery packs; a switching element configured to electrically switch disconnection and connection of the electric power path; and a controller configured to control the switching element. The controller performs a pack balance control that causes, when at least one of predetermined control start conditions is satisfied, the switching element to repeatedly open and close to perform an intermittent charging and discharging operation between the plurality of battery packs, and reduces a potential difference between the plurality of battery packs.

17 Claims, 7 Drawing Sheets

ELECTRIC VEHICLE, AND CONTROL METHOD FOR ELECTRIC VEHICLE

CROSS-REFERENCE TO RELATED APPLICATIONS

This application is based on and claims priority under 35 USC 119 from Japanese Patent Application No. 2022-207041 filed on Dec. 23, 2022, the contents of which are incorporated herein by reference.

TECHNICAL FIELD

The present disclosure relates to an electric vehicle and a control method for the electric vehicle.

BACKGROUND ART

WO2015/068753A1 discloses an electric vehicle including a plurality of battery packs.

According to WO2015/068753A1, it is possible to drive a motor by using electric power supplied from the plurality of battery packs to cause the electric vehicle to travel. Each of the plurality of battery packs is detachable, and is detached from the electric vehicle and charged by using a charger.

However, when the motor is driven by using the electric power supplied from the plurality of battery packs, a current flows between the plurality of battery packs and makes it difficult to drive the motor, and the service life of each of the battery packs is reduced in some cases.

In particular, when the current flowing between the plurality of battery packs is an overcurrent, the plurality of battery packs, an electric power path electrically connecting the plurality of battery packs, and other electrical components may be electrically damaged.

SUMMARY OF INVENTION

Accordingly, an object of the present disclosure is to provide an electric vehicle in which a current flowing between a plurality of battery packs is prevented from being an overcurrent.

According to an illustrative aspect of the present disclosure, an electric vehicle includes: a motor configured to cause the electric vehicle to travel; a plurality of battery packs configured to supply electric power to the motor; an electric power path electrically connecting the motor and the plurality of battery packs; a switching element configured to electrically switch disconnection and connection of the electric power path; and a controller configured to control the switching element. The controller performs a pack balance control that causes, when at least one of predetermined control start conditions is satisfied, the switching element to repeatedly open and close to perform an intermittent charging and discharging operation between the plurality of battery packs, and reduces a potential difference between the plurality of battery packs.

According to the present disclosure, due to the intermittent charging and discharging operation, it is possible to reduce the potential difference between the plurality of battery packs while suppressing an amount of electricity flowing between the plurality of battery packs per unit time. Accordingly, the current flowing between the plurality of battery packs is prevented from being an overcurrent, and the electric power path, the plurality of battery packs, and other electrical components are protected. In addition, by reducing the potential difference between the plurality of battery packs, the current is suppressed from flowing between the plurality of battery packs when the electric vehicle travels.

According to another illustrative aspect of the present disclosure, a control method for an electric vehicle that includes a motor configured to cause the electric vehicle to travel, a plurality of battery packs configured to supply electric power to the motor, an electric power path electrically connecting the motor and the plurality of battery packs, a switching element configured to electrically switch disconnection and connection of the electric power path, includes: a pack balance control that causes the switching element to repeatedly open and close and thereby performing an intermittent charging and discharging operation between the plurality of battery packs, and reduces a potential difference between the plurality of battery packs.

According to the present disclosure, due to the intermittent charging and discharging operation, it is possible to reduce the potential difference between the plurality of battery packs while suppressing an amount of electricity flowing between the plurality of battery packs per unit time. Accordingly, the current flowing between the plurality of battery packs is prevented from being an overcurrent, and the electric power path, the plurality of battery packs, and other electrical components are protected. In addition, by reducing the potential difference between the plurality of battery packs, the current is suppressed from flowing between the plurality of battery packs when the electric vehicle travels.

Advantageous Effects of Invention

Therefore, according to the electric vehicle of the present disclosure, it is possible to reduce the potential difference between the plurality of battery packs while preventing the current flowing between the plurality of battery packs from being an overcurrent.

DESCRIPTION OF EMBODIMENTS

Figure 1:
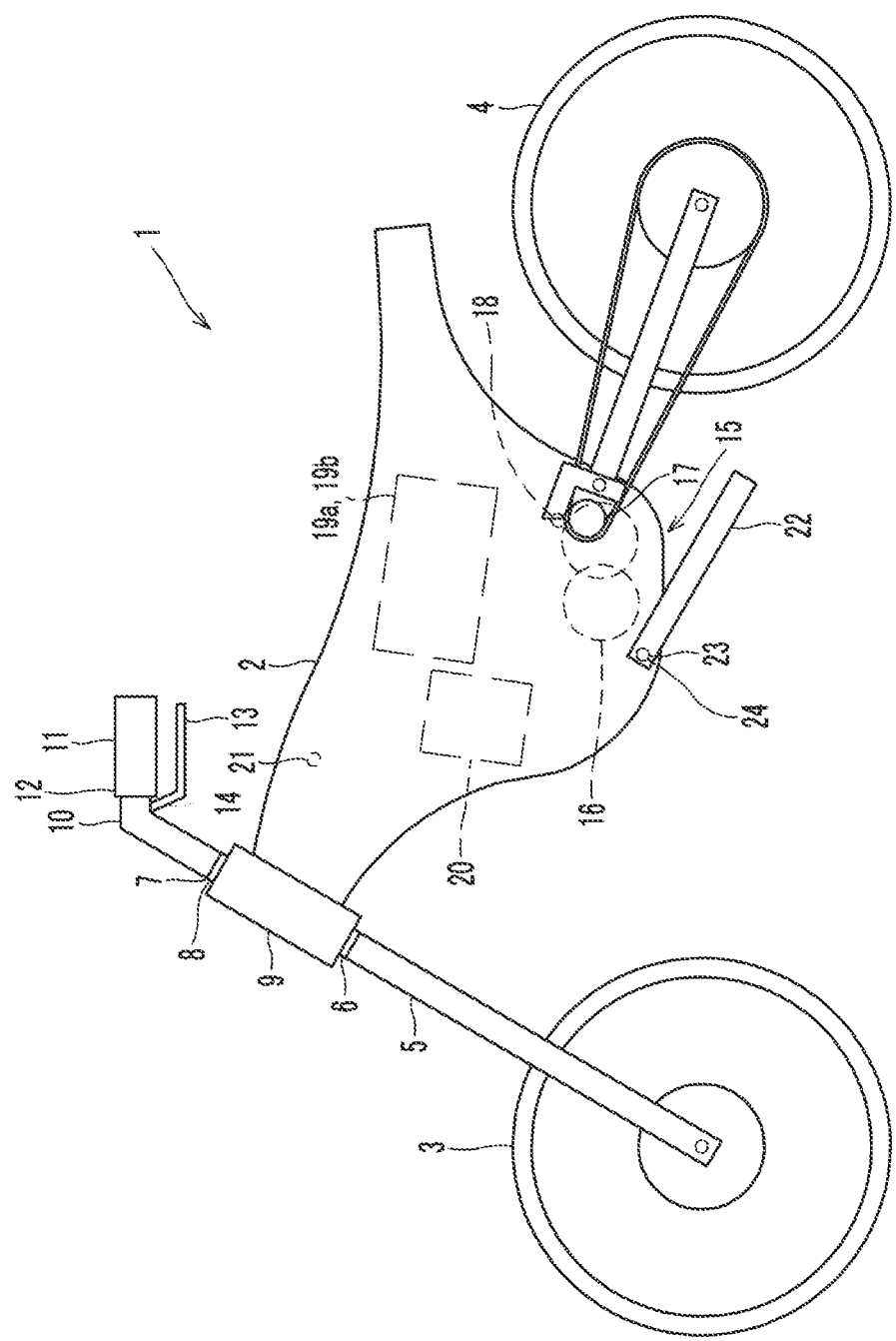
FIG. 1 is a side view of an electric vehicle according to an embodiment of the present disclosure.

Hereinafter, an embodiment of the present disclosure will be described with reference to the accompanying drawings.
Configuration of Electric Vehicle FIG. 1 is a side view of an electric vehicle (hereinafter referred to as an "electric motorcycle") 1 according to the embodiment of the present disclosure. Directions such as a front direction, a rear direction, a right direction, and a left direction in the present embodiment are directions viewed by a driver riding on the electric motorcycle 1.

The electric motorcycle 1 includes a frame 2 that is a main body of the electric motorcycle 1, a front wheel 3 disposed in front of the frame 2, and a rear wheel 4 disposed behind the frame 2.

The front wheel 3 is rotatably supported by a lower portion of a front fork 5 extending in an up-down direction. The front fork 5 is supported by a steering shaft 8 via an upper bracket 7 provided at an upper end portion of the front fork 5 and a lower bracket 6 provided below the upper bracket 7. The steering shaft 8 is pivotably supported by a head pipe 9 attached to the frame 2.

A handlebar 10 extending in a left-right direction is attached to the upper bracket 7. The front wheel 3 is steered around the steering shaft 8 as a rotation shaft due to a swing operation of the handlebar 10 toward the left-right direction performed by the driver.

An accelerator grip 11 is rotatably attached to the handlebar 10 on both sides. When starting or accelerating the electric motorcycle 1, the driver issues a start request or an acceleration request by rotating the accelerator grip 11. The accelerator grip 11 includes an accelerator grip sensor 12 electrically connected to a control unit 20 to be described later. The accelerator grip sensor 12 transmits a signal including the start request or the acceleration request described above to the control unit 20 by detecting the rotation of the accelerator grip 11.

Further, a brake lever 13 is operably attached to the handlebar 10 on both sides. When stopping the electric motorcycle 1, the driver operates the brake lever 13 to issue a braking request, and when starting the electric motorcycle 1, the driver releases the brake lever 13 to issue a brake-releasing request. The brake lever 13 includes a brake switch 14 electrically connected to the control unit 20 to be described later. The brake switch 14 transmits a signal including the braking request or the brake-releasing request described above to the control unit 20 by detecting an operation on the brake lever 13.

A drive system 15 for driving the rear wheel 4 is disposed inside the frame 2 in order to cause the electric motorcycle 1 to travel. The drive system 15 includes a motor 16 that generates a driving force by being supplied with electric power, and an output shaft 17 that outputs the driving force of the motor 16 toward the rear wheel 4. Further, a vehicle speed sensor 18 electrically connected to the control unit 20 to be described later is disposed inside the frame 2. The vehicle speed sensor 18 detects a rotation speed of the output shaft 17 and transmits a signal including the rotation speed to the control unit 20.

Two chargeable and dischargeable battery packs 19a, 19b, which are electrically connected to the motor 16 and supply electric power to the motor 16, are disposed inside the frame 2. Each of the two battery packs 19a, 19b is detachable from the frame 2. In the present embodiment, the two battery packs 19a, 19b are disposed, and three or more battery packs may be disposed.

The control unit 20 electrically connected to electrical components such as the accelerator grip sensor 12, the brake switch 14, the motor 16, the vehicle speed sensor 18, and the battery packs 19a, 19b is disposed inside the frame 2. The control unit 20 is an integrated circuit that controls the drive system 15, particularly the motor 16, and controls the two battery packs 19a, 19b in response to the signals transmitted from the accelerator grip sensor 12, the vehicle speed sensor 18, and the like, and the control unit 20 includes a processor 20a that performs a control process and a memory 20b that stores a control program.

An outside air temperature sensor 21 is attached inside the frame 2. The outside air temperature sensor 21 is electrically connected to the control unit 20, and transmits a signal including an outside air temperature to the control unit 20.

A rod-shaped side stand 22 is attached to a side surface of the frame 2. The side stand 22 has a side stand shaft 23 extending in the left-right direction at one end thereof. The side stand shaft 23 is connected to the frame 2 and serves as a rotation shaft of the side stand 22. For example, when the driver starts the electric motorcycle 1, the driver rotates the side stand 22 upward by using a foot so that the side stand 22 is rotated upward around the side stand shaft 23 to move away from the ground, on the other hand, when the driver parks the electric vehicle 1, the driver lowers the side stand 22 by using the foot so that the side stand 22 is rotated downward around the side stand shaft 23 to contact the ground. In addition, the side stand 22 includes a side stand sensor 24 that is electrically connected to the control unit 20 and transmits a signal including a state of the side stand 22 described above to the control unit 20.

Configuration of Electric Circuit

Figure 2:
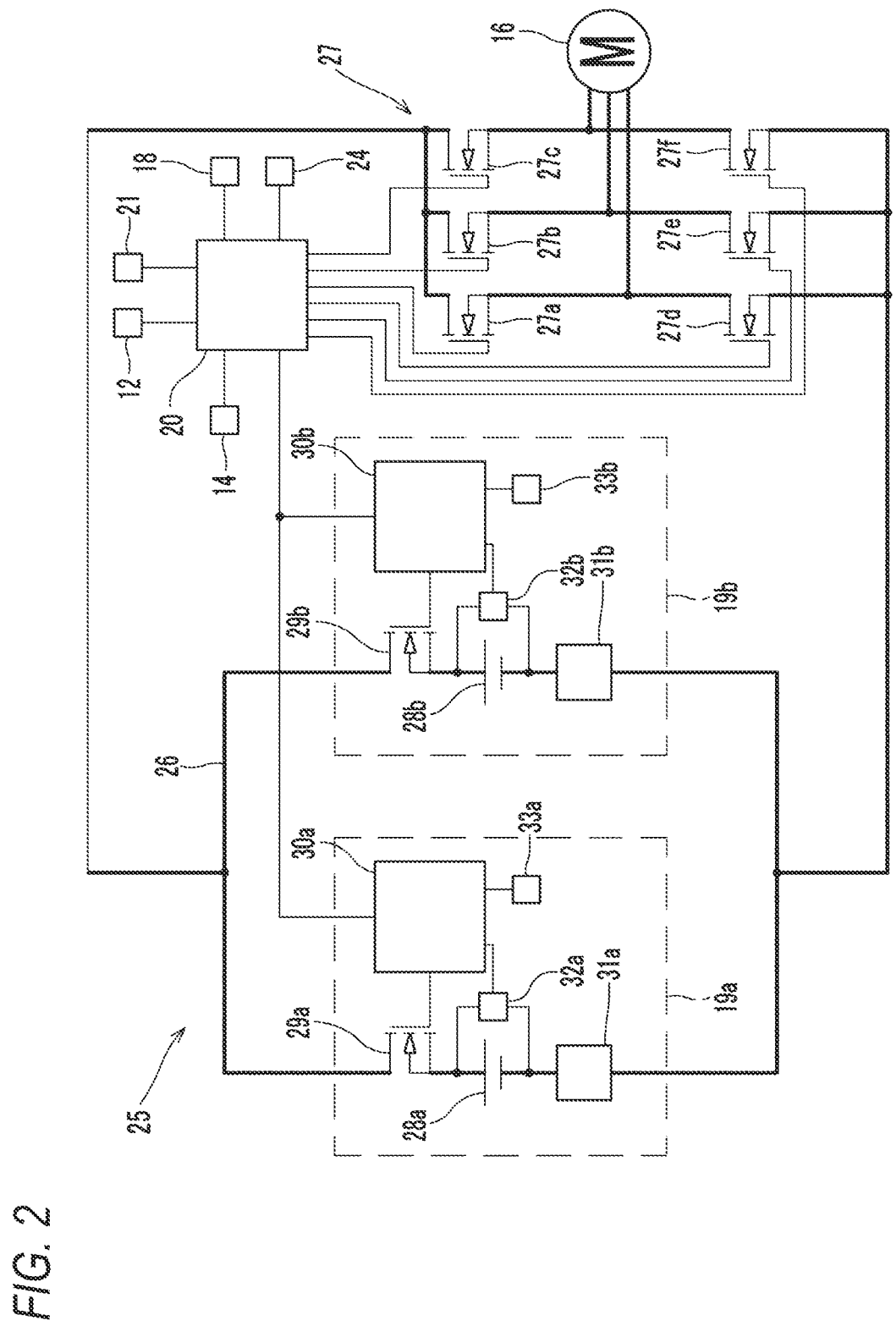
FIG. 2 is a circuit diagram of the electric vehicle in FIG. 1.

FIG. 2 is a circuit diagram of the electric motorcycle 1 in FIG. 1, and particularly illustrates an electric circuit 25 that electrically connects the motor 16, the two battery packs 19a, 19b, and the control unit 20.

The electric circuit 25 includes an electric power path 26 that connects the two battery packs 19a, 19b in parallel to each other and electrically connects the two battery packs 19a, 19b to the motor 16 via an inverter circuit 27 to be described later in order to supply the electric power from the two battery packs 19a, 19b to the motor 16.

The electric circuit 25 also includes the inverter circuit 27 that adjusts the frequency of AC power supplied to the motor 16. The inverter circuit 27 includes switching elements 27a to 27f mutually connected in a three-phase bridge manner. Each of the switching elements 27a to 27f is a MOSFET, and a gate thereof is electrically connected to the control unit 20.

Each of the switching elements 27a to 27f has a characteristic of closing to electrically conduct between a source and a drain when a voltage is applied to the gate, and opening to not electrically conduct between the source and the drain when no voltage is applied to the gate. Therefore, the control unit 20 adjusts the frequency of the AC power supplied to the motor 16 by controlling the voltage applied to the gates of the switching elements 27a to 27f.

In the present embodiment, the two battery packs 19a, 19b respectively include battery cells 28a, 28b that supply the electric power to the motor 16 via the electric power path 26 and the inverter circuit 27, switching elements 29a, 29b that respectively switch electrical disconnection and connection between positive electrodes of the battery cells 28a, 28b and the electric power path 26, battery controllers 30a, 30b that respectively control the switching elements 29a, 29b, and protection circuits 31a, 31b that respectively protect the battery packs 19a, 19b.

In FIG. 2, each of the battery cells 28a, 28b is illustrated as a single battery cell for simplification, and each of the battery cells 28a, 28b may be implemented by a plurality of battery cells.

The switching elements 29a, 29b are MOSFETs, sources thereof are electrically connected to the positive electrodes of the battery cells 28a, 28b, drains thereof are electrically connected to the electric power path 26, and gates thereof are electrically connected to the battery controllers 30a, 30b, respectively.

Each of the switching elements 29a, 29b has a characteristic of closing to electrically conduct between the source and the drain when a voltage is applied to the gate, and opening to not electrically conduct between the source and the drain when no voltage is applied to the gate. Therefore, the battery cells 28a, 28b are electrically connected to the electric power path 26 when the voltage is applied to the gates of the switching elements 29a, 29b, and are electrically disconnected from the electric power path 26 when no voltage is applied to the gates of the switching elements 29a, 29b.

The battery controllers 30a, 30b are integrated circuits, and respectively control the voltage applied to the gates of the switching elements 29a, 29b so as to open or close the switching elements 29a, 29b. By the battery controllers 30a, 30b opening or closing the switching elements 29a, 29b, the electrical disconnection and connection between the battery cells 28a, 28b and the electric power path 26 are controlled, and the supply of the electric power to the motor 16 from the two battery packs 19a, 19b and charging and discharging between the two battery packs 19a, 19b are performed.

The protection circuits 31a, 31b are integrated circuits that include current measurement circuits for measuring currents flowing through the battery cells 28a, 28b, and are electrically connected to negative electrodes of the battery cells 28a, 28b and the electric power path 26, respectively. When the measured currents are larger than a predetermined protection current threshold value, the protection circuits 31a, 31b electrically interrupt between the battery cells 28a, 28b and the electric power path 26, thereby preventing an overcurrent from flowing through the battery cells 28a, 28b and protecting the battery packs 19a, 19b. The protection current threshold value is determined based on an allowable maximum current of the battery cells 28a, 28b.

In the present embodiment, the two battery packs 19a, 19b include potential measurement circuits 32a, 32b that measure potentials V1, V2 of the battery packs 19a, 19b, and include temperature sensors 33a, 33b that measure temperatures K1, K2 of the battery packs 19a, 19b, respectively.

The potential measurement circuits 32a, 32b are electrically connected to the positive electrodes and the negative electrodes of the battery cells 28a, 28b and the battery controllers 30a, 30b, and transmit signals including the measured potentials V1, V2 to the battery controllers 30a, 30b, respectively.

The temperature sensors 33a, 33b are electrically connected to the battery controllers 30a, 30b, and transmit signals including the temperatures K1, K2 of the battery packs 19a, 19b to the battery controllers 30a, 30b, respectively.

The battery controllers 30a, 30b are electrically connected to the control unit 20. The control unit 20 controls the battery controllers 30a, 30b by respectively transmitting signals including instructions to open or close the switching elements 29a, 29b to the battery controllers 30a, 30b.

The memory 20b of the control unit 20 stores a program for causing the battery controllers 30a, 30b to control the switching elements 29a, 29b, in particular, a program for a pack balance control.

The pack balance control is a control that causes, when a predetermined control start condition to be described later is satisfied, the switching elements 29a, 29b to repeatedly open or close every predetermined control period CO so as to perform a charging and discharging operation between the two battery packs 19a, 19b, and reduces a potential difference ΔV between the two battery packs 19a, 19b.

Functions achieved by the components described in the present description may be implemented in a circuitry or a processing circuitry including a general-purpose processor, a specific-purpose processor, an integrated circuit, application specific integrated circuits (ASICs), a central processing unit (CPU), a typical circuit in the related art, and/or a combination thereof, the circuitry or the processing circuitry is programmed to achieve the described functions. The processor 20a includes a transistor and other circuits, and is regarded as the circuitry or the processing circuitry. The processor 20a may be a programmed processor that executes the program stored in the memory 20b. In the present description, the circuitry, the unit, and the means are hardware programmed to achieve the functions described above or hardware for executing the functions described above. The hardware may be any hardware disclosed in the present description, or any hardware that is programmed to achieve the functions described above, or is known as hardware for executing the functions described above. When the hardware is a processor regarded as a circuitry type processor, the circuitry, the means, or the unit is a combination of hardware and software used to configure the hardware and/or a processor.

Figure 3:
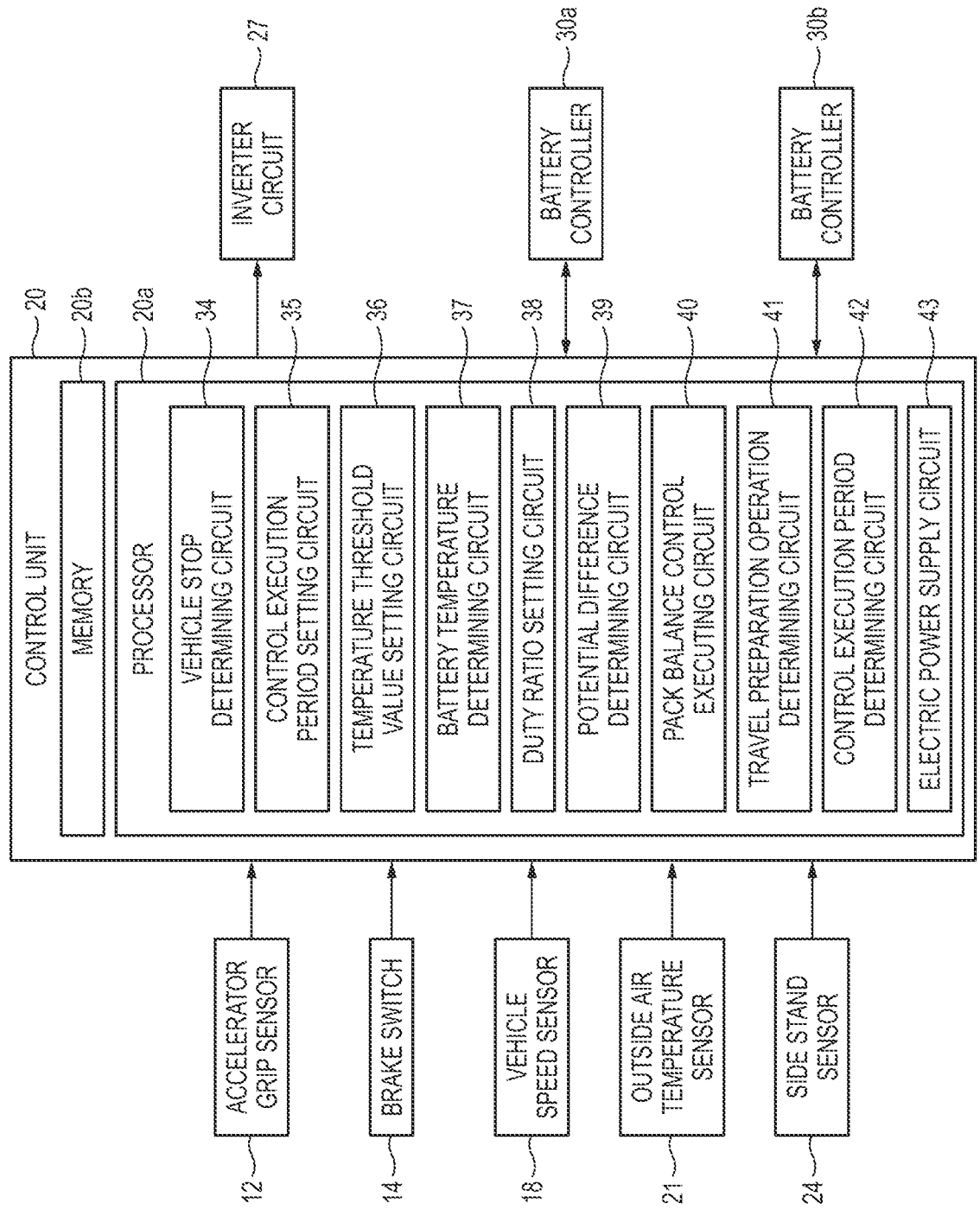
FIG. 3 is a block diagram illustrating a system for a pack balance control performed by the circuit in FIG. 2.

FIG. 3 is a block diagram illustrating a system for the pack balance control to be performed by the electric circuit 25 in FIG. 2, and particularly illustrates a control circuit that is included in the processor 20a of the control unit 20 operating to execute the pack balance control.

The processor 20a includes a vehicle stop determining circuit 34, a control execution period setting circuit 35, a temperature threshold value setting circuit 36, a battery temperature determining circuit 37, a duty ratio setting circuit 38, a potential difference determining circuit 39, a pack balance control executing circuit 40, a travel preparation operation determining circuit 41, a control execution period determining circuit 42, and an electric power supply circuit 43.

The vehicle stop determining circuit 34 determines whether the electric motorcycle 1 is stopped based on the signals received from the accelerator grip sensor 12, the vehicle speed sensor 18, and the side stand sensor 24. More specifically, when the accelerator grip sensor 12 does not transmit the signal including the start request or the acceleration request to the control unit 20, when the vehicle speed sensor 18 transmits a signal indicating that the rotation speed of the output shaft 17 is zero to the control unit 20, or when the side stand sensor 24 transmits a signal indicating that the side stand 22 contacts the ground to the control unit 20, the vehicle stop determining circuit 34 determines that the electric motorcycle 1 is stopped. On the other hand, when none of the above conditions is satisfied, the vehicle stop determining circuit 34 determines that the electric motorcycle 1 is not stopped.

The control execution period setting circuit 35 sets a control execution period T0 during which the pack balance control is performed. More specifically, when the side stand sensor 24 transmits a signal indicating that the side stand 22 is moved away from the ground to the control unit 20, the electric motorcycle 1 is not parked, and thus the control execution period setting circuit 35 determines that it is necessary to ensure the startability of the electric motorcycle 1, and sets the control execution period T0 to a short period. On the other hand, when the side stand sensor 24 transmits the signal indicating that the side stand 22 contacts the ground to the control unit 20, the electric motorcycle 1 is parked, and thus the control execution period setting circuit 35 determines that it is not necessary to ensure the startability of the electric motorcycle 1, and sets the control execution period T0 to a long period.

The temperature threshold value setting circuit 36 sets a temperature threshold value K0 based on the signal including the outside air temperature transmitted from the outside air temperature sensor 21 to the control unit 20. More specifically, the temperature threshold value setting circuit 35 sets the temperature threshold value K0 to a low temperature as the outside air temperature increases, and sets the temperature threshold value K0 to a high temperature as the outside air temperature decreases.

The battery temperature determining circuit 37 determines whether the temperatures K1, K2 are lower than the temperature threshold value K0 based on the signals including the temperatures K1, K2 of the battery packs 19a, 19b, which are transmitted from the temperature sensors 33a, 33b to the control unit 20 via the battery controllers 30a, 30b.

The duty ratio setting circuit 38 sets a duty ratio DR0 of the pack balance control. The duty ratio DR0 is the ratio of a time D1 during which the voltage is applied to the gates of the switching elements 29a, 29b and the switching elements 29a, 29b are closed, to the control period CO. More specifically, in order to prevent deterioration due to the temperatures of the battery packs 19a. 19b as the temperatures K1, K2 increase, the duty ratio setting circuit 38 sets the duty ratio DR0 to a small value such that the current flowing between the battery pack 19a and the battery pack 19b is reduced. On the other hand, in order to promote the charging and discharging of the battery packs 19a. 19b as the temperatures K1, K2 decrease, the duty ratio setting circuit 38 sets the duty ratio DR0 to a large value such that the current flowing between the battery pack 19a and the battery pack 19b is increased. Further, in order to prevent the electrical interruption between the battery cells 28a. 28b and the electric power path 26 due to the operations of the protection circuits 31a, 31b, the duty ratio setting circuit 38 sets the duty ratio DR0 such that the current flowing between the battery pack 19a and the battery pack 19b becomes smaller than the protection current threshold value.

The potential difference determining circuit 39 calculates the potential difference ΔV between the battery pack 19a and the battery pack 19b based on the signals including the potentials V1, V2 of the battery packs 19a, 19b, which are respectively transmitted from the potential measurement circuits 32a. 32b to the control unit 20 via the battery controllers 30a, 30b, and then determines whether the potential difference ΔV is larger than a predetermined potential difference threshold value ΔV0 or whether the potential difference ΔV is smaller than the predetermined potential difference threshold value ΔV0. The potential difference threshold value ΔV0 is set to a potential difference at which the current hardly flows between the battery pack 19a and the battery pack 19b when the electric power is supplied from the battery packs 19a, 19b to the motor 16 via the inverter circuit 27.

The pack balance control executing circuit 40 performs the pack balance control.

Figure 4:
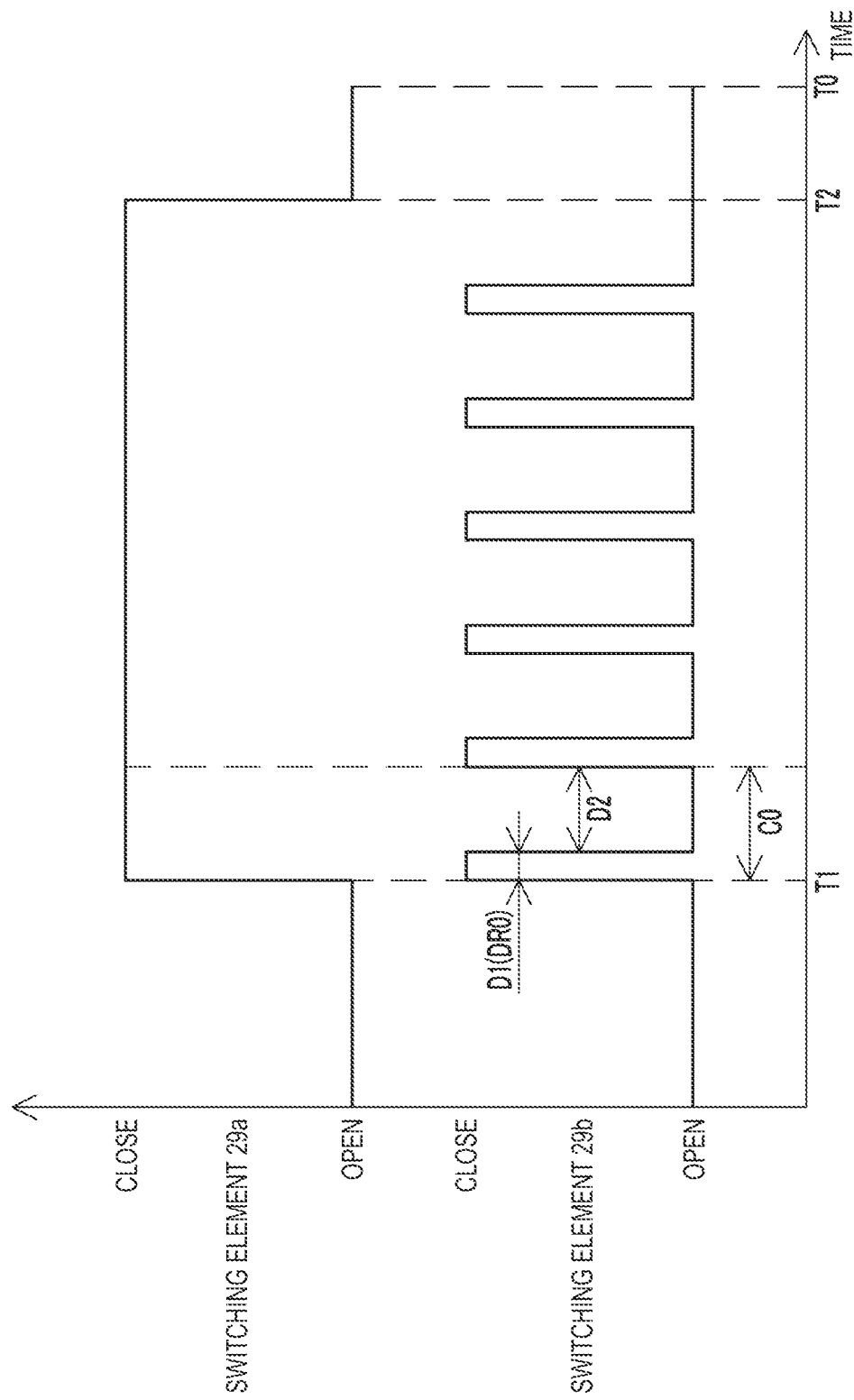
FIG. 4 is a time chart of the pack balance control performed by the circuit in FIG. 2.

FIG. 4 is a time chart of the pack balance control performed by the electric circuit 25 in FIG. 2, and illustrates an example in which a current flows from the battery pack 19a to the battery pack 19b when the potential V1 of the battery pack 19a measured by the potential measurement circuit 32a is higher than the potential V2 of the battery pack 19b measured by the potential measurement circuit 32b.

In the example illustrated in FIG. 4, the pack balance control starts at a time T1. When performing the pack balance control, the pack balance control executing circuit 40 transmits a signal including an instruction to close the switching element 29a to the battery controller 30a for every control period CO. The battery controller 30a applies the voltage to the gate of the switching element 29a in response to the reception of the signal including the instruction to close the switching element 29a. When the voltage is applied to the gate, the switching element 29a closes to electrically conduct between the battery cell 28a and the electric power path 26.

At the same time, the pack balance control executing circuit 40 transmits a signal including an instruction to open and close the switching element 29b at the duty ratio DR0 to the battery controller 30b for every control period CO. The battery controller 30b applies the voltage to the gate of the switching element 29b at the duty ratio DR0 in response to the reception of the signal including the instruction to open and close the switching element 29b at the duty ratio DR0. That is, the battery controller 30b applies the voltage to the gate of the switching element 29a during a time D1, and does not apply the voltage to the gate of the switching element 29a during a remaining time D2 with respect to the control period CO. When the voltage is applied to the gate at the duty ratio DR0, the switching element 29b opens and closes to electrically conduct between the battery cell 28b and the electric power path 26 at the duty ratio DR0. That is, the switching element 29b closes to electrically conduct between the battery cell 28b and the electric power path 26 during the time D1, and opens to not electrically conduct between the battery cell 28b and the electric power path 26 during the remaining time D2 with respect to the control period CO.

When the switching element 29a continuously closes during the control period CO, the battery cell 28a is continuously electrically connected to the electric power path 26. On the other hand, when the switching element 29b opens and closes at the duty ratio DR0, the battery cell 28b is electrically connected to the electric power path 26 at the duty ratio DR0. Therefore, an intermittent charging and discharging operation at the duty ratio DR0 is performed between the battery pack 19a and the battery pack 19b.

In FIG. 3, the travel preparation operation determining circuit 41 determines whether a preparation operation for causing the electric motorcycle 1 to travel is performed by the driver. More specifically, when the signal including the brake-releasing request is transmitted from the brake switch 14 to the control unit 20, or when a signal including a shift request from the driver is transmitted to the control unit 20, the travel preparation operation determining circuit 41 determines that the preparation operation is performed by the driver. On the other hand, when none of the above conditions is satisfied, the travel preparation operation determining circuit 41 determines that the preparation operation is not performed by the driver.

The control execution period determining circuit 42 determines whether the control execution period T0 has elapsed.

The electric power supply circuit 43 transmits a signal including an instruction to close one or both of the switching element 29a and the switching element 29b to the corresponding battery controllers 30a, 30b. The battery controllers 30a. 30b apply the voltage to the gates of the switching elements 29a, 29b in response to the reception of the signals including the instructions to close the switching elements 29a, 29b, respectively. Since the voltage is applied to the gates, the switching elements 29a, 29b close to electrically conduct between the battery cells 28a, 28b and the electric power path 26, respectively. Therefore, the electric power is supplied from one or both of the battery pack 19a and the battery pack 19b to the motor 16 via the inverter circuit 27.

The memory 20b stores a processing program for executing functions of the vehicle stop determining circuit 34, the control execution period setting circuit 35, the temperature threshold value setting circuit 36, the battery temperature determining circuit 37, the duty ratio setting circuit 38, the potential difference determining circuit 39, the pack balance control executing circuit 40, the travel preparation operation determining circuit 41, the control execution period determining circuit 42, and the electric power supply circuit 43, which are mentioned above.

The processor 20a executes the processing program for executing functions of the vehicle stop determining circuit 34, the control execution period setting circuit 35, the temperature threshold value setting circuit 36, the battery temperature determining circuit 37, the duty ratio setting circuit 38, the potential difference determining circuit 39, the pack balance control executing circuit 40, the travel preparation operation determining circuit 41, 20) the control execution period determining circuit 42, and the electric power supply circuit 43, which is stored in the memory 20b, so as to achieve the functions of the vehicle stop determining circuit 34, the control execution period setting circuit 35, the temperature threshold value setting circuit 36, the battery temperature determining circuit 37, the duty ratio setting circuit 38, the potential difference determining circuit 39, the pack balance control executing circuit 40, the travel preparation operation determining circuit 41, the control execution period determining circuit 42, and the electric power supply circuit 43.

In the present embodiment, the processor 20a is an integrated circuit and individually includes the vehicle stop determining circuit 34, the control execution period setting circuit 35, the temperature threshold value setting circuit 36, the battery temperature determining circuit 37, the duty ratio setting circuit 38, the potential difference determining circuit 39, the pack balance control executing circuit 40, the travel preparation operation determining circuit 41, the control execution period determining circuit 42, and the electric power supply circuit 43, and the processor 20a may be a microprocessor that collects the functions of the vehicle stop determining circuit 34, the control execution period setting circuit 35, the temperature threshold value setting circuit 36, the battery temperature determining circuit 37, the duty ratio setting circuit 38, the potential difference determining circuit 39, the pack balance control executing circuit 40, the travel preparation operation determining circuit 41, the control execution period determining circuit 42, and the electric power supply circuit 43.

Pack Balance Control

Figure 5:
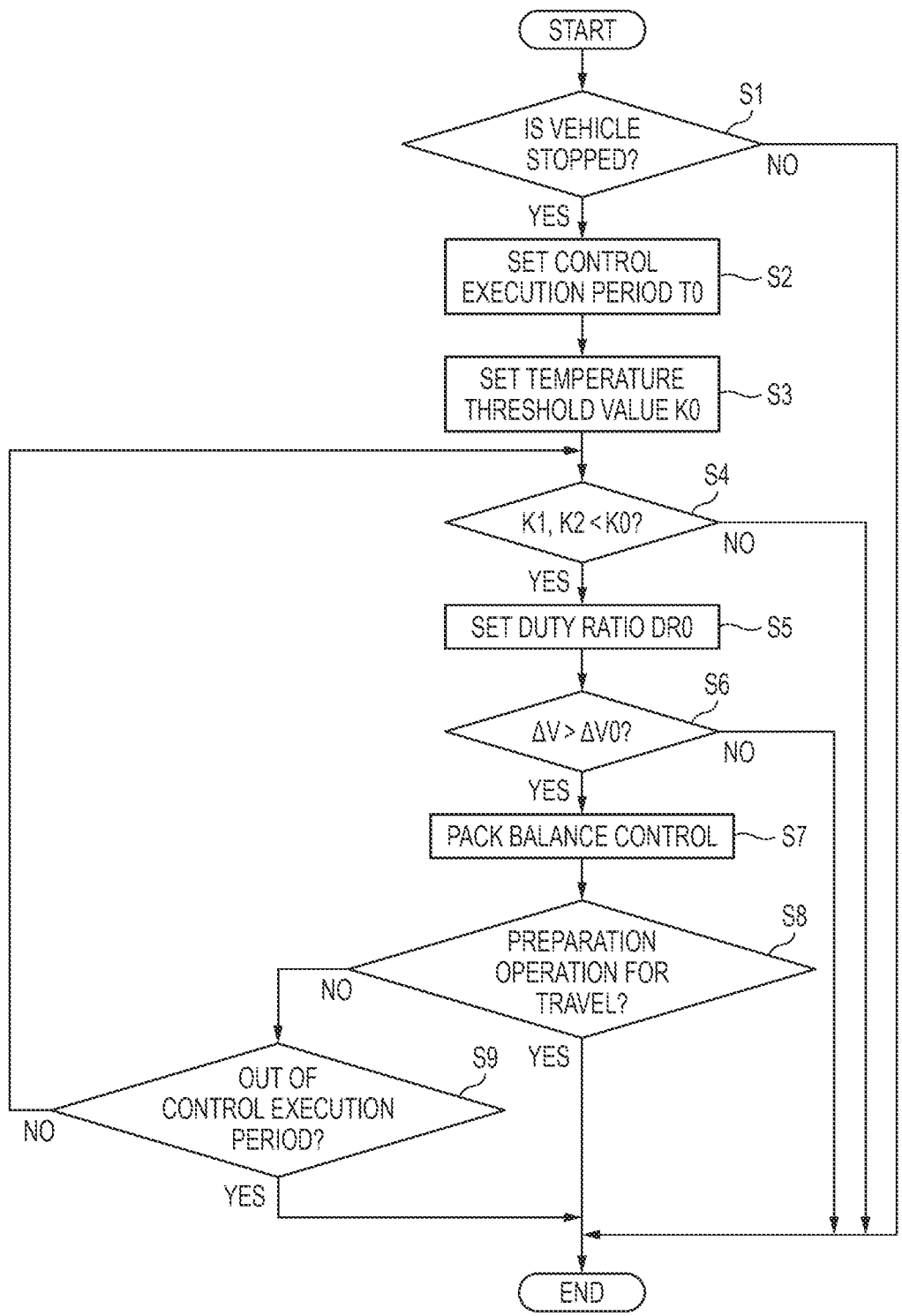
FIG. 5 is a flowchart of the pack balance control performed by the circuit in FIG. 2.

FIG. 5 is a flowchart of the pack balance control performed by the electric circuit 25 in FIG. 2, and particularly illustrates the control process executed by the processor 20a. The memory 20b of the control unit 20 stores the program for performing the pack balance control according to the illustrated flowchart.

In step S1, the vehicle stop determining circuit 34 determines whether the electric motorcycle 1 is stopped based on the signals received from the accelerator grip sensor 12, the vehicle speed sensor 18, and the side stand sensor 24 as a first control start condition. If it is determined that the electric motorcycle 1 is not stopped (NO in step S1), the control process ends so that the pack balance control is not performed, and if it is determined that the electric motorcycle 1 is stopped (YES in step S1), the control process proceeds to the next step S2.

In step S2, the control execution period setting circuit 35 sets the control execution period T0 during which the pack balance control is performed.

Next, in step S3, the temperature threshold value setting circuit 36 sets the temperature threshold value K0.

Next, in step S4, the battery temperature determining circuit 37 determines whether the temperatures $K_1$, $K_2$ of the battery packs 19a, 19b are lower than the temperature threshold value K0 based on the signals including the temperatures $K_1$, $K_2$ of the battery packs 19a, 19b, which are respectively transmitted from the temperature sensors 33a, 33b to the control unit 20 via the battery controllers 30a, 30b, as a second control start condition. If it is determined that the temperature of at least one battery pack is higher than the temperature threshold value K0 (NO in step S4), in order to prevent the deterioration due to the temperatures of the battery packs 19a, 19b, the control process ends so that the pack balance control is not performed. On the other hand, if it is determined that the temperatures $K_1$, $K_2$ of the battery packs 19a, 19b are lower than the temperature threshold value K0 (YES in step S4), the control process proceeds to the next step S5.

In step S5, the duty ratio setting circuit 38 sets the duty ratio DR0 of the pack balance control.

Next, in step S6, the potential difference determining circuit 39 calculates the potential difference $\Delta V$ between the battery pack 19a and the battery pack 19b based on the signals including the potentials $V_1$, $V_2$ of the battery packs 19a, 19b, which are respectively transmitted from the potential measurement circuits 32a, 32b to the control unit 20 via the battery controllers 30a, 30b, and then determines whether the potential difference $\Delta V$ is larger than the predetermined potential difference threshold value $\Delta V0$ as a third control start condition. If it is determined that the potential difference $\Delta V$ is smaller than the potential difference threshold value $\Delta V0$ (NO in step S6), since it is not necessary to perform the pack balance control, the control process ends, and if it is determined that the potential difference $\Delta V$ is larger than the potential difference threshold value $\Delta V0$ (YES in step S6), the control process proceeds to the next step S7.

In step S7, the pack balance control executing circuit 40 performs the pack balance control described above during the control period CO. Thereafter, when the control period CO has elapsed, the control process proceeds to the next step S8. Alternatively, during the control period CO, when the travel preparation operation determining circuit 41 determines that the preparation operation is performed by the driver, or when the battery temperature determining circuit 37 determines that the temperature of at least one battery pack included in the battery packs 19a, 19b is higher than the temperature threshold value K0, the pack balance control is interrupted, and the control process proceeds to the next step S8.

In step S8 of FIG. 5, the travel preparation operation determining circuit 41 determines whether the preparation operation for causing the electric motorcycle 1 to travel is performed by the driver as a first control end condition. If it is determined that the preparation operation is performed by the driver (YES in step S8), the control process ends, and if it is determined that the preparation operation is not performed by the driver (NO in step S8), the control process proceeds to the next step S9.

In step S9, the control execution period determining circuit 42 determines whether the control execution period T0 has elapsed as a second control end condition. If it is determined that the control execution period T0 has elapsed (YES in step S9), the control process ends, and if it is determined that the control execution period T0 has not elapsed (NO in step S9), the control process returns to step S4.

Therefore, the control process repeats steps S4 to S9 every control period CO.

Figure 6:
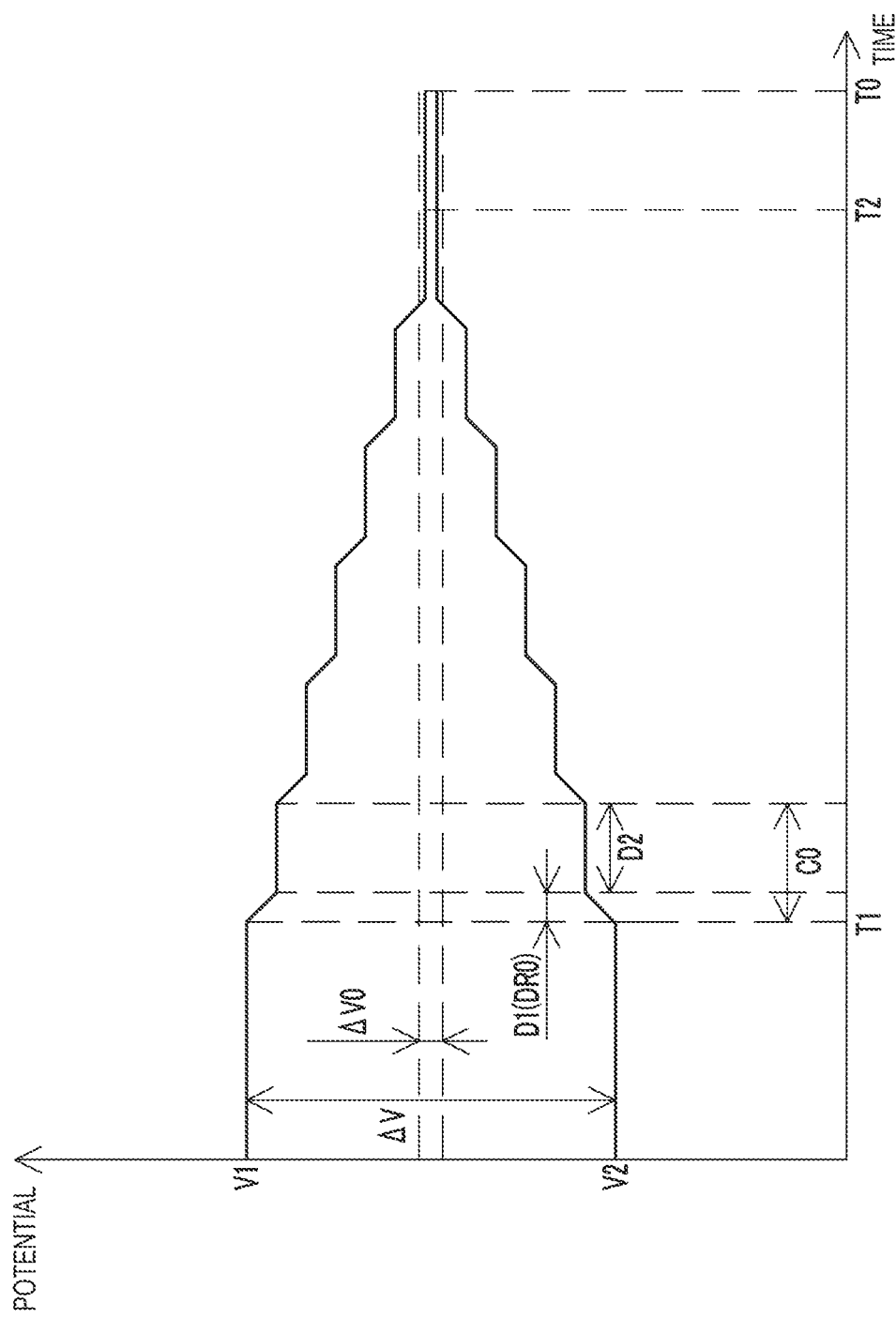
FIG. 6 is a graph illustrating a potential transition of battery packs by the pack balance control in FIG. 4.

FIG. 6 is a graph illustrating transition of the potentials V1, V2 of the battery packs 19a, 19b due to the pack balance control in FIG. 4.

At the time T1, the potential V1 of the battery pack 19a is higher than the potential V2 of the battery pack 19b. Thereafter, the pack balance control is performed, and thus the current flows from the battery pack 19a to the battery pack 19b. As described above, since the pack balance control is performed as the intermittent charging and discharging operation at the duty ratio DR0, an amount of electricity per unit time flowing from the battery pack 19a to the battery pack 19b is suppressed such that the current flowing between the battery pack 19a and the battery pack 19b does not become an overcurrent, and the potential difference ΔV between the battery pack 19a and the battery pack 19b gradually decreases.

Thereafter, at a time T2, the potential difference ΔV between the battery pack 19a and the battery pack 19b becomes smaller than the potential difference threshold value ΔV0, the control process ends in step S6.

When the pack balance control ends at the time T2, the control unit 20 transmits signals including instructions to open the switching elements 29a, 29b to the battery controllers 30a, 30b, respectively. The battery controllers 30a, 30b do not apply the voltage to the gates of the switching elements 29a, 29b in response to the reception of the signals including the instructions to open the switching elements 29a, 29b, respectively. Since no voltage is applied to the gates, the switching elements 29a, 29b open to not electrically conduct between the battery cells 28a, 28b and the electric power path 26, respectively. Accordingly, the charging and discharging operation is not performed between the battery pack 19a and the battery pack 19b.

The above example of the pack balance control shows the case where the current flows from the battery pack 19a to the battery pack 19b, and the pack balance control is also performed in a case where the current flows from the battery pack 19b to the battery pack 19a.

The pack balance control is performed with reference to the flow including steps S1 to S9 described above.

Method for Electric Power Supply to Motor

The electric motorcycle 1 has a mode in which the electric power is supplied from the two battery packs 19a, 19b to the motor 16.

Figure 7:
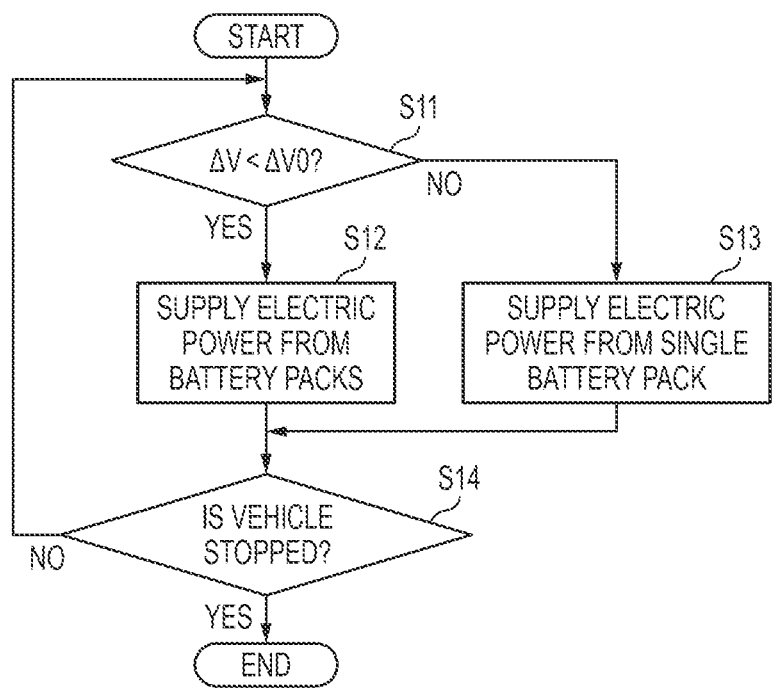
FIG. 7 is a flowchart of electric power supply performed by the circuit in FIG. 2.

FIG. 7 is a flowchart of the electric power supply performed by the electric circuit 25 in FIG. 2, and particularly illustrates the control process performed by the processor 20a of the control unit 20. The memory 20b of the control unit 20 stores a program for supplying the electric power to the motor 16 with reference to the illustrated flowchart.

In step S11, the potential difference determining circuit 39 calculates the potential difference ΔV between the battery pack 19a and the battery pack 19b based on the signals including the potentials V1, V2 of the battery packs 19a, 19b, which are respectively transmitted from the potential measurement circuits 32a, 32b to the control unit 20 via the battery controllers 30a, 30b, and then determines whether the potential difference ΔV is smaller than the predetermined potential difference threshold value ΔV0.

If it is determined in step S11 that the potential difference ΔV is smaller than the potential difference threshold value ΔV0 (YES in step S11), the control process proceeds to step S12. In step S12, the electric power supply circuit 43 transmits signals including instructions to close the switching element 29a and the switching element 29b to the battery controller 30a and the battery controller 30b, respectively. The battery controllers 30a, 30b apply the voltage to the gates of the switching elements 29a, 29b in response to the reception of the signals including the instructions to close the switching elements 29a, 29b, respectively. Since the voltage is applied to the gates, the switching elements 29a, 29b close to electrically conduct between the battery cells 28a, 28b and the electric power path 26, respectively. Therefore, the electric power is supplied from both the battery pack 19a and the battery pack 19b to the motor 16 via the inverter circuit 27. The motor 16 receives the electric power supply from both the battery pack 19a and the battery pack 19b and outputs a large driving force.

If it is determined in step S11 that the potential difference ΔV is larger than the potential difference threshold value ΔV0 (NO in step S11), the control process proceeds to step S13.

In step S13, in order to suppress the flow of the current between the battery pack 19a and the battery pack 19b by the electric power supply circuit 43, a signal including an instruction to close the switching element of one battery pack having a high potential among the battery packs 19a, 19b is transmitted to the corresponding one of the battery controller 30a and the battery controller 30b. The battery controllers 30a, 30b apply the voltage to the gates of the switching elements 29a, 29b in response to the reception of the signals including the instructions to close the switching elements 29a, 29b, respectively. Since the voltage is applied to the gates, the switching elements 29a, 29b close to electrically conduct between the battery cells 28a, 28b and the electric power path 26, respectively. Therefore, the electric power is supplied from one of the battery pack 19a and the battery pack 19b to the motor 16 via the inverter circuit 27. The motor 16 receives the electric power supply from the single battery pack and outputs the driving force.

After step S12 or step S13, the control process proceeds to step S14. In step S14, the vehicle stop determining circuit 34 determines whether the electric motorcycle 1 is stopped based on information included in the signals received from the accelerator grip sensor 12, the vehicle speed sensor 18, and the side stand sensor 24 as in step S1 of the flowchart in FIG. 5.

In step S14, if it is determined that the electric motorcycle 1 is not stopped (NO in step S14), the control process returns to step S11, and if it is determined that the electric motorcycle 1 is stopped (YES in step S14), the control process ends.

Further, the control unit 20 according to the present embodiment performs a control process for charging the two battery packs 19a, 19b by using regenerative power of the motor 16. When the motor 16 generates the regenerative power, the control unit 20 transmits a signal including an instruction to close the switching element 29a or the switching element 29b to the battery controller 30a or the battery controller 30b so as to charge one low-potential battery pack having a low potential among the two battery packs 19a, 19b by using the regenerative power. The potential difference ΔV between the high-potential battery pack and the low-potential battery pack is reduced by preferentially charging the low-potential battery pack by using the regenerative power of the motor 16.

Operations and Effects

The electric motorcycle 1 configured as described above has the following features.

The electric motorcycle 1 according to the present embodiment includes:
- the motor 16 that causes the electric motorcycle 1 to travel:
- the two battery packs 19a, 19b that supply the electric power to the motor 16;
- the electric power path 26 electrically connecting the motor 16 and the two battery packs 19a, 19b:
- the switching elements 29a, 29b that switch the electrical disconnection and connection with the electric power path 26; and
- the control unit 20 and the battery controllers 30a, 30b that control the switching elements 29a, 29b, in which
- the control unit 20 and the battery controllers 30a, 30b perform the pack balance control that causes, when the predetermined control start condition is satisfied, the switching elements 29a, 29b to repeatedly open and close so as to perform the intermittent charging and discharging operation between the two battery packs 19a, 19b, and reduce the potential difference $\Delta V$ between the two battery packs 19a, 19b.

According to the present embodiment, due to the intermittent charging and discharging operation, it is possible to reduce the potential difference $\Delta V$ between the two battery packs 19a, 19b while suppressing the amount of electricity per unit time flowing between the battery packs 19a, 19b. Accordingly, the current flowing between the two battery packs 19a, 19b is prevented from becoming an overcurrent, and the electric power path 26, the two battery packs 19a, 19b, and other electrical components are protected. In addition, by reducing the potential difference $\Delta V$ between the two battery packs 19a, 19b, the current is suppressed from flowing between the two battery packs 19a, 19b when the electric motorcycle 1 travels.

Further, the electric motorcycle 1 includes the accelerator grip sensor 12, the vehicle speed sensor 18, and the side stand sensor 24 which detect information indicating that the electric motorcycle 1 is stopped and transmit the information to the control unit 20, the control start condition is the determination that the electric motorcycle 1 is stopped, which is performed by the control unit 20 based on the information.

According to the present embodiment, when it is determined that the electric motorcycle 1 is stopped by using the accelerator grip sensor 12, the vehicle speed sensor 18, and the side stand sensor 24, the pack balance control is performed. Therefore, when the electric motorcycle 1 travels, the pack balance control is not performed, and thus the potential difference $\Delta V$ between the two battery packs 19a, 19b can be reduced while suppressing an influence on traveling comfort.

In addition, the two battery packs 19a, 19b include the temperature sensors 33a, 33b that detect the temperatures K1, K2 of the two battery packs 19a, 19b and transmit the temperatures K1, K2 to the control unit 20, respectively, and
- the control start condition is the determination that the temperatures K1, K2 are lower than the predetermined temperature threshold value K0, which is performed by the control unit 20.

According to the present embodiment, when it is determined that the respective temperatures K1, K2 of the two battery packs 19a, 19b are lower than the temperature threshold value K0, the pack balance control is performed. Therefore, the respective temperatures K1, K2 of the two battery packs 19a, 19b are less likely to become high, and thus the deterioration due to the temperature of the two battery packs 19a, 19b can be easily prevented.

In addition, the electric motorcycle 1 further includes the outside air temperature sensor 21 that detects the outside air temperature and transmits the outside air temperature to the control unit 20,
- the control unit 20 sets the temperature threshold value K0 to decrease as the outside air temperature increases.

According to the present embodiment, when the outside air temperature is high, the temperature threshold value K0 is set to a low temperature. Therefore, the pack balance control is difficult to be performed, and thus the deterioration due to the temperature of the two battery packs 19a, 19b can be easily prevented. In addition, when the outside air temperature is low; the temperature threshold value K0 is set to a high temperature. Therefore, the pack balance control is easy to be performed, and thus warm-up of the two battery packs 19a, 19b can be promoted.

Further, the control unit 20 sets the duty ratio DR0 of the intermittent charging and discharging operation to decrease as the temperatures K1, K2 increase.

According to the present embodiment, when the temperatures K1, K2 are high, the intermittent charging and discharging operation is performed at the small duty ratio DR0, and thus the deterioration due to the temperature of the two battery packs 19a, 19b is easily prevented. In addition, when the temperatures K1, K2 are low; the intermittent charging and discharging operation is performed at the large duty ratio DR0, and thus the potential difference $\Delta V$ between the two battery packs 19a, 19b is easily reduced.

In addition, the electric motorcycle 1 includes the protection circuits 31a, 31b that measure the current flowing through the two battery packs 19a, 19b and stop the electric power supply of the two battery packs 19a, 19b when the current is larger than the predetermined protection current threshold value, respectively, and
- the control unit 20 sets the duty ratio DR0 of the intermittent charging and discharging operation such that the current is smaller than the protection current threshold value.

According to the present embodiment, by setting the duty ratio DR0 of the intermittent charging and discharging operation such that the current flowing through the two battery packs 19a, 19b is smaller than the protection current threshold value, it is possible to reduce the potential difference $\Delta V$ between the two battery packs 19a, 19b while preventing the operations of the protection circuits 31a, 31b that stop the electric power supply of the battery packs 19a, 19b in order to prevent the current flowing between the two battery packs 19a, 19b from becoming an overcurrent and prevent the temperatures of the two battery packs 19a, 19b from increasing excessively.

In addition, the electric motorcycle 1 includes the potential measurement circuits 32a, 32b that measure the potentials V1, V2 of the two battery packs 19a, 19b, respectively, and
- the control unit 20 calculates the potential difference $\Delta V$ between the two battery packs 19a, 19b based on the respective potentials V1, V2 of the two battery packs 19a, 19b measured by the potential measurement circuits 32a, 32b, and supplies the electric power from the two battery packs 19a, 19b to the motor 16 when the potential difference $\Delta V$ is equal to or less than the predetermined potential difference threshold value $\Delta V0$.

According to the present embodiment, by supplying the electric power from the two battery packs 19a, 19b having the small potential difference ΔV to the motor 16, it is possible to suppress the current from flowing between the two battery packs 19a, 19b and to improve traveling performance of the electric motorcycle 1.

In addition, the control start condition is the determination that the potential difference ΔV between the two battery packs 19a, 19b is larger than the potential difference threshold value ΔV0, which is performed by the control unit 20.

According to the present embodiment, when the potential difference ΔV between the two battery packs 19a, 19b is large, the pack balance control is performed, and thus the potential difference ΔV between the two battery packs 19a, 19b can be reduced. Further, when the potential difference ΔV between the two battery packs 19a, 19b is small, the current flowing between the two battery packs 19a, 19b does not become an overcurrent, and thus the pack balance control is not performed.

In addition, when performing the pack balance control, the control unit 20 controls the switching elements 29a, 29b such that the current flows from the high-potential battery pack having a high potential to the low-potential battery pack having a low potential among the two battery packs 19a, 19b, and the potential difference ΔV between the high-potential battery pack and the low-potential battery pack is reduced.

According to the present embodiment, the potential difference ΔV between the high-potential battery pack and the low-potential battery pack can be reduced.

In addition, when the motor 16 generates the regenerative power, the control unit 20 controls the switching elements 29a, 29b such that the low-potential battery pack having a low potential among the two battery packs 19a, 19b is charged by using the regenerative power.

According to the present embodiment, the potential difference ΔV between the high-potential battery pack and the low-potential battery pack can be reduced by preferentially charging the low-potential battery pack by using the regenerative power of the motor 16.

In addition, when determining that the preparation operation for causing the electric motorcycle 1 to travel is performed by the driver, the control unit 20 stops the pack balance control.

According to the present embodiment, when the driver performs the preparation operation for causing the electric motorcycle 1 to travel, for example, a brake-releasing operation or a shift operation, the pack balance control is stopped, and thus the startability of the electric motorcycle 1 can be secured.

In addition, the control unit 20 sets the control execution period T0 for executing the pack balance control in accordance with a state of the electric motorcycle 1.

According to the present embodiment, when the electric motorcycle 1 is stopped without using the side stand 22, the control unit 20 determines that it is necessary to ensure the startability of the electric motorcycle 1, and sets the control execution period T0 of the pack balance control to a short period. On the other hand, when the electric motorcycle 1 is stopped by using the side stand 22, the control unit 20 determines that it is not necessary to ensure the startability of the electric motorcycle 1, and sets the control execution period T0 of the pack balance control to a long period.

In addition, the two battery packs 19a, 19b may be connected in parallel.

According to the present embodiment, even when one battery pack of the two battery packs 19a, 19b is detached, the electric motorcycle 1 can travel as long as at least one battery pack is electrically connected to the motor 16 via the electric power path 26. Further, although the potential difference ΔV is likely to occur between the two battery packs 19a, 19b, the potential difference ΔV can be reduced by the pack balance control.

In addition, the present embodiment provides a control method for the electric motorcycle 1, the control method for the electric motorcycle 1 includes the pack balance control that causes the switching elements 29a, 29b for switching the electrical disconnection and connection of the electric power path 26 to repeatedly open and close so as to perform the intermittent charging and discharging operation between the two battery packs 19a, 19b for supplying the electric power to the motor 16 causing the electric motorcycle 1 to travel, and reduces the potential difference ΔV between the two battery packs 19a, 19b, and the electric power path 26 electrically connects the motor 16 and the two battery packs 19a, 19b.

According to the control method of the present embodiment, due to the intermittent charging and discharging operation, it is possible to reduce the potential difference ΔV between the two battery packs 19a, 19b while suppressing the amount of electricity per unit time flowing between the two battery packs 19a, 19b. Accordingly, the current flowing between the two battery packs 19a, 19b is prevented from becoming an overcurrent, and the electric power path 26, the two battery packs 19a, 19b, and other electrical components are protected. In addition, by reducing the potential difference ΔV between the two battery packs 19a, 19b, the current is suppressed from flowing between the two battery packs 19a, 19b when the electric motorcycle 1 travels.

Other Embodiments

The present disclosure is not limited to the configuration of the embodiment described above, and various modifications can be made.

In the embodiment described above, the electric vehicle 1 is an electric motorcycle, and may be an electric automobile.

In the embodiment described above, the two battery packs 19a, 19b are connected in parallel, and may be connected in series.

In the embodiment described above, the protection circuits 31a, 31b respectively include the current measurement circuits, and may alternatively include temperature measurement circuits that measure the temperatures of the battery cells 28a, 28b corresponding to the currents flowing through the battery cells 28a, 28b, respectively. In this case, when the measured temperatures, that is, current equivalent values are larger than a predetermined protection current equivalent threshold value, the battery cells 28a. 28b are disconnected from the electric power path 26. The protection current equivalent threshold value is determined based on the temperatures of the battery cells 28a. 28b when the allowable maximum current of the battery cells 28a, 28b flows.

In the embodiment described above, the two battery packs 19a, 19b respectively include the temperature sensors 33a. 33b, and may alternatively include current measurement circuits that measure the currents of the battery packs 19a. 19b corresponding to the temperatures K1, K2 of the battery packs 19a, 19b, respectively. In this case, the current measurement circuits transmit signals including the measured currents, that is, temperature equivalent values to the battery controllers 30a, 30b, respectively. The temperature equivalent values are not limited to the currents, and may be values that correlate with the temperatures K1, K2 of the battery packs 19a, 19b and can indirectly indicate the temperatures K1, K2 of the battery packs 19a, 19b, for example, the number of times of charging and discharging in a predetermined time, charging rates of the battery packs 19a, 19b, the outside air temperature, coolant temperatures of the battery packs 19a, 19b, or the like. In addition, the temperature equivalent values may be corrected according to a past travel state of the electric motorcycle 1.

In the embodiment described above, the temperature threshold value K0 is set by the temperature threshold value setting circuit 36 in accordance with the outside air temperature, and may be a fixed value. In addition, in the embodiment described above, the duty ratio DR0 is set by the duty ratio setting circuit 38 in accordance with the temperatures K1, K2 of the battery packs 19a, 19b, and may be a fixed value.

According to a first aspect of the present disclosure, an electric vehicle includes: a motor configured to cause the electric vehicle to travel; a plurality of battery packs configured to supply electric power to the motor; an electric power path electrically connecting the motor and the plurality of battery packs; a switching element configured to electrically switch disconnection and connection of the electric power path; and a controller configured to control the switching element. The controller performs a pack balance control that causes, when at least one of predetermined control start conditions is satisfied, the switching element to repeatedly open and close to perform an intermittent charging and discharging operation between the plurality of battery packs, and reduces a potential difference between the plurality of battery packs.

According to a second aspect of the present disclosure, the electric vehicle in the first aspect further includes: a vehicle stop sensor configured to detect information indicating that the electric vehicle is stopped and transmit the information to the controller. The at least one of the control start conditions includes a determination performed by the controller that the electric vehicle is stopped based on the information.

According to a third aspect of the present disclosure, in the first or second aspect, each of the plurality of battery packs includes a temperature equivalent value sensor that detects a temperature equivalent value corresponding to a temperature for each of the plurality of battery packs and transmits the temperature equivalent value to the controller, and the at least one of the control start conditions includes a determination performed by the controller that the temperature equivalent value is smaller than a predetermined temperature equivalent threshold value.

According to a fourth aspect of the present disclosure, in the third aspect, the electric vehicle further includes: an outside air temperature sensor configured to detect an outside air temperature and transmit the outside air temperature to the controller. The controller sets the temperature equivalent threshold value to decrease as the outside air temperature increases.

According to a fifth aspect of the present disclosure, in the third or fourth aspect, the controller set a duty ratio of the intermittent charging and discharging operation to decrease as the temperature equivalent value increases.

According to a sixth aspect of the present disclosure, the electric vehicle in any one of the first to fifth aspects further includes a protection circuit configured to measure a current equivalent value corresponding to a current flowing through the plurality of battery packs, and stop supplying the electric power to the plurality of battery packs when the current equivalent value is larger than a predetermined protection current equivalent threshold value. The controller sets a duty ratio of the intermittent charging and discharging operation such that the current equivalent value is smaller than the protection current equivalent threshold value.

According to a seventh aspect of the present disclosure, the electric vehicle in any one of the first to sixth aspects further includes a potential measurement circuit configured to measure a potential for each of the plurality of battery packs. The controller calculates the potential difference between the plurality of battery packs based on the potentials of the plurality of battery packs measured by the potential measurement circuit, and supplies the electric power from the plurality of battery packs to the motor when the potential difference is equal to or less than a predetermined potential difference threshold value.

According to an eighth aspect of the present disclosure, in the seventh aspect, the at least one of the control start conditions includes a determination performed by the controller that the potential difference between the plurality of battery packs is larger than the potential difference threshold value.

According to a ninth aspect of the present disclosure, in the eighth aspect, when performing the pack balance control, the controller controls the switching element such that a current flows from a high-potential battery pack having a high potential to a low-potential battery pack having a low potential among the plurality of battery packs, and thereby reducing a potential difference between the high-potential battery pack and the low-potential battery pack.

According to a tenth aspect of the present disclosure, in any one of the seventh to ninth aspects, when the motor generates regenerative power, the controller controls the switching element such that a low-potential battery pack having a lower potential is charged by the regenerative power among the plurality of battery packs.

According to an eleventh aspect of the present disclosure, in any one of the first to tenth aspects, when determining that a preparation operation for causing the electric vehicle to travel is performed by a driver, the controller stops the pack balance control.

According to a twelfth aspect of the present disclosure, in any one of the first to eleventh aspects, the controller sets a control execution period for executing the pack balance control in accordance with a state of the electric vehicle.

According to a thirteenth aspect of the present disclosure, in any one of the first to twelfth aspects, the plurality of battery packs are connected in parallel.

According to a fourteenth aspect of the present disclosure, a control method for an electric vehicle that includes a motor configured to cause the electric vehicle to travel, a plurality of battery packs configured to supply electric power to the motor, an electric power path electrically connecting the motor and the plurality of battery packs, a switching element configured to electrically switch disconnection and connection of the electric power path, includes: a pack balance control that causes the switching element to repeatedly open and close and thereby performing an intermittent charging and discharging operation between the plurality of battery packs, and reduces a potential difference between the plurality of battery packs.

According to a fifteenth aspect of the present disclosure, a non-transitory computer readable medium stores a program causing a computer to execute the control method for the electric vehicle in the fourteenth aspect.

What is claimed is:
1. An electric vehicle, comprising:
a motor configured to cause the electric vehicle to travel;
a plurality of battery packs configured to supply electric power to the motor;

an electric power path electrically connecting the motor and the plurality of battery packs;
a switching element configured to electrically switch disconnection and connection of the electric power path; and
a controller configured to control the switching element, wherein
the controller performs a pack balance control that causes, when at least one of predetermined control start conditions is satisfied, the switching element to repeatedly open and close to perform an intermittent charging and discharging operation between the plurality of battery packs, and reduces a potential difference between the plurality of battery packs,
the controller performs the pack balance control when determining that the potential difference between the plurality of battery packs is larger than a potential difference threshold value,
the controller causes a current to flow from a battery pack of the plurality of battery packs having a high potential to another battery pack of the plurality of battery packs having a low potential among the plurality of battery packs, and thereby reducing the potential difference between the plurality of battery packs, the battery having the high potential having higher potential than the another battery pack having the low potential,
the switching element includes a plurality of switching elements, and
the pack balance control is, during a predetermined control period, a control of:
continuously electrically connecting one battery pack of the plurality of battery packs to the electric power path by continuously closing one switching element of the plurality of switching elements; and
electrically connecting another battery pack to the electric power path at a predetermined duty ratio by opening and closing another one switching element of the plurality of switching elements at the predetermined duty ratio.

2. The electric vehicle according to claim 1, further comprising:
a vehicle stop sensor configured to detect information indicating that the electric vehicle is stopped and transmit the information to the controller, wherein
the at least one of the control start conditions includes a determination performed by the controller that the electric vehicle is stopped based on the information.

3. The electric vehicle according to claim 1, wherein
each of the plurality of battery packs includes a temperature equivalent value sensor that detects a temperature equivalent value corresponding to a temperature for each of the plurality of battery packs and transmits the temperature equivalent value to the controller, and
the at least one of the control start conditions includes a determination performed by the controller that the temperature equivalent value is smaller than a predetermined temperature equivalent threshold value.

4. The electric vehicle according to claim 3, further comprising:
an outside air temperature sensor configured to detect an outside air temperature and transmit the outside air temperature to the controller, wherein
the controller sets the temperature equivalent threshold value to decrease as the outside air temperature increases.

5. The electric vehicle according to claim 3, wherein
the controller set a duty ratio of the intermittent charging and discharging operation to decrease as the temperature equivalent value increases.

6. The electric vehicle according to claim 1, further comprising:
a protection circuit configured to measure a current equivalent value corresponding to a current flowing through the plurality of battery packs, and stop supplying the electric power to the plurality of battery packs when the current equivalent value is larger than a predetermined protection current equivalent threshold value, wherein
the controller sets a duty ratio of the intermittent charging and discharging operation such that the current equivalent value is smaller than the protection current equivalent threshold value.

7. The electric vehicle according to claim 1, further comprising:
a potential measurement circuit configured to measure a potential for each of the plurality of battery packs, wherein
the controller calculates the potential difference between the plurality of battery packs based on the potentials of the plurality of battery packs measured by the potential measurement circuit, and supplies the electric power from the plurality of battery packs to the motor when the potential difference is equal to or less than the predetermined potential difference threshold value, and
the plurality of battery packs includes a battery pack to be discharged and a battery pack to be charged, a potential difference of the battery pack to be discharged and the battery pack to be charged being measured.

8. The electric vehicle according to claim 7, wherein
the at least one of the control start conditions includes a determination performed by the controller that the potential difference between the plurality of battery packs is larger than the potential difference threshold value.

9. The electric vehicle according to claim 8, wherein
when performing the pack balance control, the controller controls the switching element such that the current flows from the battery having the high potential to the another battery pack having the low potential, and thereby reducing a potential difference between the battery having the high potential to the another battery pack having the low potential.

10. The electric vehicle according to claim 7, wherein
when the motor generates regenerative power, the controller controls the switching element such that a low-potential battery pack having a lower potential is charged by the regenerative power among the plurality of battery packs.

11. The electric vehicle according to claim 1, wherein
when determining that a preparation operation for causing the electric vehicle to travel is performed by a driver, the controller stops the pack balance control.

12. The electric vehicle according to claim 1, wherein
the controller sets a control execution period for executing the pack balance control in accordance with a state of the electric vehicle.

13. The electric vehicle according to claim 1, wherein
the plurality of battery packs are connected in parallel, and
the battery packs are detachable from a frame of the electric vehicle.

14. The electric vehicle according to claim 1, wherein a discharge-side battery pack of the plurality of battery packs and a charge-side battery pack of the plurality of battery packs are independently detachable from the electric vehicle.

15. The electric vehicle according to claim 1, wherein, when a single battery pack of the plurality of battery packs is connected to the vehicle, power is supplied to the motor, and wherein, when two battery packs of the plurality of battery packs are connected to the vehicle, power is supplied to the motor from one or both of the two battery packs.

16. The electric vehicle according to claim 1, wherein the pack balance control stops when releasing a brake or performing gear-shifting operations.

17. A control method for an electric vehicle that includes a motor configured to cause the electric vehicle to travel, a plurality of battery packs configured to supply electric power to the motor, an electric power path electrically connecting the motor and the plurality of battery packs, a switching element configured to electrically switch disconnection and connection of the electric power path, the control method comprising:

a pack balance control that causes the switching element to repeatedly open and close and thereby performing an intermittent charging and discharging operation between the plurality of battery packs, and reduces a potential difference between the plurality of battery packs, wherein the pack balance control is performed when determining that the potential difference between the plurality of battery packs is larger than a potential difference threshold value, and the pack balance control includes causing a current to flow from a battery pack of the plurality of battery packs having a high potential to another battery pack of the plurality of battery packs having a low potential among the plurality of battery packs, and thereby reducing the potential difference between the plurality of battery packs, the battery having the high potential having higher potential than the another battery pack having the low potential, wherein the switching element includes a plurality of switching elements, and the pack balance control is, during a predetermined control period, a control of:

continuously electrically connecting one battery pack of the plurality of battery packs to the electric power path by continuously closing one switching element of the plurality of switching elements; and electrically connecting another battery pack to the electric power path at a predetermined duty ratio by opening and closing another one switching element of the plurality of switching elements at the predetermined duty ratio.

* * * * *